United States Patent
Ogawa et al.

(10) Patent No.: US 9,637,070 B2
(45) Date of Patent: May 2, 2017

(54) POWER SUPPLY STRUCTURE FOR SLIDING DOOR

(71) Applicants: YAZAKI CORPORATION, Minato-ku, Tokyo (JP); AISIN SEIKI KABUSHIKI KAISHA, Kariya-shi, Aichi (JP)

(72) Inventors: Tatsuo Ogawa, Kosai (JP); Akitomo Iijima, Kosai (JP); Yushi Tanamura, Kariya (JP)

(73) Assignees: Yazaki Corporation, Minato-ku, Tokyo (JP); AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 0 days.

(21) Appl. No.: 15/027,054

(22) PCT Filed: Oct. 3, 2014

(86) PCT No.: PCT/JP2014/076565
§ 371 (c)(1),
(2) Date: Apr. 4, 2016

(87) PCT Pub. No.: WO2015/053191
PCT Pub. Date: Apr. 16, 2015

(65) Prior Publication Data
US 2016/0236630 A1    Aug. 18, 2016

(30) Foreign Application Priority Data
Oct. 11, 2013 (JP) .................................. 2013-214056

(51) Int. Cl.
*B60J 5/00* (2006.01)
*B60R 16/02* (2006.01)
(Continued)

(52) U.S. Cl.
CPC ............ *B60R 16/02* (2013.01); *B60R 16/027* (2013.01); *H02G 11/00* (2013.01)

(58) Field of Classification Search
CPC ........ B60R 16/02; B60R 16/027; H02G 11/00
See application file for complete search history.

(56) References Cited

U.S. PATENT DOCUMENTS

2009/0194327 A1* 8/2009 Tsubaki ................. H02G 11/00
  174/72 A
2009/0223132 A1   9/2009 Aoki et al.

FOREIGN PATENT DOCUMENTS

JP    2008-148539 A    6/2008
JP    2009-65814 A     3/2009
(Continued)

OTHER PUBLICATIONS

International Search Report of PCT/JP2014/076565, dated Dec. 22, 2014. [PCT/ISA/210].
(Continued)

*Primary Examiner* — Lori L Lyjak
(74) *Attorney, Agent, or Firm* — Sughrue Mion, PLLC

(57) ABSTRACT

A power supply structure for a sliding door includes other end-side holding portion which holds the other end of the electric wire. The other end-side holding portion includes first and second turning arms which are rotatably supported directly or indirectly by the sliding door and hold the electric wire at a tip end thereof, and biasing unit which biases the first turning arm in a direction to absorb an extra length of the electric wire. The tip end of the second turning arm inclines with respect to a longitudinal direction of a vehicle at climbing-over timing at which the electric wire climbs over a predetermined climbing-over position of a lower end
(Continued)

edge of a door trim which configures the sliding door on an inner side of the vehicle when the sliding door is slid and moved.

4 Claims, 11 Drawing Sheets

(51) Int. Cl.
*H02G 11/00* (2006.01)
*B60R 16/027* (2006.01)

(56) References Cited

FOREIGN PATENT DOCUMENTS

JP       2009-171783 A    7/2009
WO    WO2004082090 A1 *  9/2004

OTHER PUBLICATIONS

Written Opinion of PCT/JP2014/076565, dated Dec. 22, 2014. [PCT/ISA/237].

* cited by examiner

POWER SUPPLY STRUCTURE FOR SLIDING DOOR

CROSS REFERENCE TO RELATED APPLICATIONS

This application is a National Stage of International Application No. PCT/JP2014/076565 filed Oct. 3, 2014, claiming priority based on Japanese Patent Application No. 2013-214056, filed Oct. 11, 2013, the contents of all of which are incorporated herein by reference in their entirety.

TECHNICAL FIELD

The present invention relates to a power supply structure for a sliding door for routing an electric wire between a vehicle body and a sliding door and for supplying power.

BACKGROUND ART

A sliding door which is slidably supported by a vehicle body of an automobile is conventionally utilized, and electronic devices such as a door lock switch, a window glass open/close switch and a courtesy lamp are mounted on the sliding door. Hence, to connect an electronic device mounted on the sliding door and an electronic device such as a control device provided on a vehicle body, a power supply structure for routing an electric wire (wire harness) between a vehicle body and the sliding door is used in the vehicle provided with the sliding door. As such a power supply structure, there is proposed one having an arm member which holds an electric wire, which is turnably pivotally supported by a door panel, and which is biased in an extra length absorbing direction of the electric wire (e.g., refer to Patent Literature 1).

The conventional power supply structure for a sliding door having the above-described arm member will be described. As illustrated in FIG. 11, the conventional power supply structure for a sliding door is located between a door panel P and a door trim T of a sliding door D, and an electric wire W is held by a tip end of a turnably supported turning arm 101. One end of the electric wire W on the side of a vehicle body is fixed to a fixing tool 102 provided on the side of the vehicle body. FIG. 11 is a perspective view of the conventional sliding door D as viewed from inside of a vehicle. In FIG. 11, a right side shows a front side of the vehicle and a left side shows a rear side of the vehicle. The sliding door D slidably opens on leftward (rearward of vehicle) in FIG. 11. When the sliding door D opens, the turning arm 101 turns to pull up the electric wire W, thereby absorbing an extra length.

When the sliding door D opens, as shown by an arrow C, the sliding door D projects outward of the vehicle and moves rearward. At this time, as illustrated in FIG. 12, a portion of the electric wire W located between the door panel P and the door trim T of the sliding door D climbs over a lower end edge of the door trim T toward the vehicle body when the sliding door D projects in the direction of the arrow C. FIG. 12 is a sectional view taken along arrows Vb in FIG. 11.

CITATION LIST

Patent Literature

Patent Literature 1: JP 2009-65814 A

SUMMARY OF INVENTION

Technical Problem

According to the above-described conventional power supply structure for a sliding door, a positional relation between the sliding door D and the electric wire W when the sliding door D opens and closes is as follows. FIGS. 13A to 13C are schematic diagrams showing the positional relation between the sliding door D and the electric wire W when the sliding door D opens and closes. In FIGS. 13A to 13C, this positional relation is shown in sectional views of the sliding door D take along a cut plane which is parallel to a scuff trim ST on a floor of the vehicle. FIG. 13A shows the sliding door D in a state where it opens to some extent. FIG. 13B shows the sliding door D immediately after the sliding door D projects when it opens or immediately before the sliding door D fully closes, and FIG. 13C shows the sliding door D in its fully closed state.

As illustrated in FIGS. 13A to 13C, when the sliding door D opens, as its opening operation proceeds, an abutting portion PA between the electric wire W and the door trim T moves forward of the vehicle in the sliding door D, and an abutment angle θA between the electric wire W and the door trim T becomes larger. When the sliding door D closes, as its closing operation proceeds, the abutting portion PA moves rearward of the vehicle in the sliding door D and the abutment angle θA becomes smaller.

When the sliding door D is shifted to the fully closed state illustrated in FIG. 13C, or when the sliding door D is going to open from the fully closed state, the abutment angle θA becomes small, and when the electric wire W extends substantially parallel to a lower end edge of the door trim T, a portion of the electric wire W extending in parallel is prone to be caught in the lower end edge of the door trim T. In such a caught electric wire W, stress is stored, and if the stress reaches a certain level, the electric wire W climbs over the lower end edge of the door trim T at one stroke. If the electric wire W climbs over the lower end edge of the door trim T at one stroke, there is a problem that vibration of the electric wire W at that time rumbles in passenger's ear as an unusual noise.

A later-described kick-up portion is provided on the lower end edge of the door trim T on a rear side of the vehicle. FIG. 14 shows the kick-up portion provided on the lower end edge of the door trim T. As illustrated in FIG. 14, the scuff trim ST is placed on the floor of the vehicle, and the kick-up portion K is formed by raising the lower end edge of the door trim T on the rear side of the vehicle upward to separate from the scuff trim ST at a kick-up angle θK.

Conventionally, to restrain the electric wire W from being caught in the lower end edge of the door trim T when the sliding door D opens and closes, the kick-up portion K is increased in size and a gap Ar between the scuff trim ST and the door trim T is increased in many cases. However, there is a problem that if the gap Ar is increased, appearance of the sliding door D is deteriorated.

In view of these circumferences, it is an object of the present invention to provide a power supply structure for a sliding door capable of suppressing an unusual noise caused by vibration of the electric wire when the sliding door opens and closes, and capable of enhancing the appearance of the sliding door.

Solution to Problem

To achieve the above object, the present invention provides a power supply structure for a sliding door for routing an electric wire between a vehicle body and the sliding door to supply power. The power supply structure comprises: one end-side holding portion which is provided on the vehicle body and which holds one end of the electric wire; and other end-side holding portion which holds the other end of the electric wire. The other end-side holding portion includes a turning arm turnably supported directly or indirectly by the sliding door and holding the electric wire at a tip end, and biasing unit for biasing the turning arm in a direction to absorb an extra length of the electric wire. The tip end of the turning arm is inclined with respect to a longitudinal direction of a vehicle at climbing-over timing at which the electric wire climbs over a predetermined climbing-over position of a lower end edge of a door trim which configures the sliding door on an inner side of the vehicle when the sliding door is slid and moved.

In the power supply structure for a sliding door, the tip end of the turning arm has a bent-shape directing toward a space located closer to outside of the vehicle than the door trim in the sliding door.

Further, in the power supply structure for a sliding door, a turning shaft of the turning arm is inclined with respect to the sliding door.

The power supply structure for a sliding door further includes angle-changing unit for directing the tip end of the turning arm to a space located closer to outside of the vehicle than the door trim in the sliding door at the climbing-over timing.

In the power supply structure for a sliding door, the angle-changing unit may make a tip end of the turning arm face toward the space by bending the turning arm.

In the power supply structure for a sliding door, the angle-changing unit may make the tip end of the turning arm face toward the space by inclining a turning shaft of the turning arm with respect to the sliding door.

Advantageous Effects of Invention

According to the present invention, since the tip end of the turning arm faces toward the space, the electric wire climbs over the lower end edge of the door trim at the climbing-over timing in a state where the electric wire W inclines with respect to the lower end edge of the door trim. As a result, the electric wire W is restrained from being caught in the lower end edge of the door trim when the sliding door is slid and moved, the electric wire can smoothly climbs over the lower end edge of the door trim, and vibration of the electric wire when it climbs over can also be suppressed. According to this, an unusual noise caused by vibration of the electric wire when the sliding door opens and closes is suppressed. Since the electric wire is restrained from being caught, the above-described kick-up portion can be made small in size correspondingly. As a result, a gap between the scuff trim and the door trim on the floor of the vehicle is made small, and appearance of the sliding door is enhanced.

According to the present invention, since the tip end of the turning arm has the bent-shape facing toward the space, the electric wire can reliably incline with respect to the lower end edge of the door trim including the climbing-over timing.

According to the present invention, since the turning shaft of the turning arm inclines with respect to the door panel, the electric wire can reliably incline with respect to the lower end edge of the door trim including the climbing-over timing.

According to the present invention, since the angle-changing unit makes the tip end of the turning arm face toward the space at the climbing-over timing, rubbing between the sliding door and the electric wire except at the climbing-over timing can be suppressed, and the electric wire can smoothly climb over the lower end edge of the door trim. As a specific method for turning the tip end of the second turning arm toward the space by the angle-changing unit, the tip end of the turning arm may face toward the space by the structure of the shaft itself of the turning arm, or the tip end of the turning arm may face toward the space by applying an external force to the turning arm by a projection provided on the sliding door for example.

According to the present invention, if the angle-changing portion made by the angle-changing unit is the turning arm itself, it is possible to employ an angle-changing structure in which the angle-changing portion is kept to the minimum.

According to the present invention, if the angle-changing portion made by the angle-changing unit is the turning shaft of the turning arm, it is possible to employ an angle-changing structure in which strength reduction of the turning arm itself is suppressed.

DESCRIPTION OF EMBODIMENTS

Figure 1A:
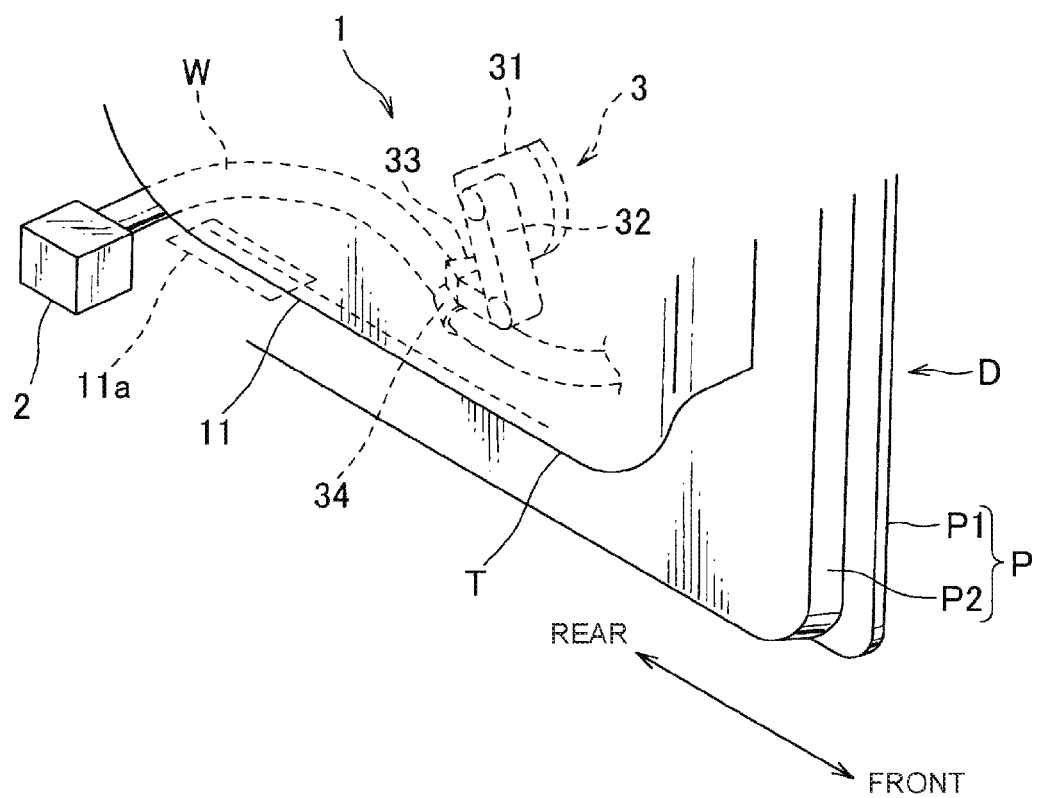
FIGS. 1A and 1B are perspective views of a sliding door of a first embodiment as viewed from inside of a vehicle.

A power supply structure for a sliding door according to a first embodiment of the present invention will be described using FIGS. 1A, 1B, and 2. A power supply structure 1 for a sliding door of the embodiment routes an electric wire W between a vehicle body and a sliding door D for connecting an electronic device provided on the side of the vehicle body and another electronic device mounted on the sliding door D to each other, and the power supply structure 1 supplies power to the electronic device provided on the sliding door D. The sliding door D is composed of metal door outer panel P1 and door inner panel P2 as a door panel P, and a door trim T made of synthetic resin which is opposed to an inner side of a vehicle of the door inner panel P2. The electric wire is composed of a wire harness formed from a plurality of electric wires, and a connector is mounted on a terminal of the electric wire W. The electric wire W is also composed of an exterior member (e.g., corrugated tube) for covering and protecting the wire harness.

The power supply structure 1 for the sliding door is composed of one end-side holding portion 2 provided on the vehicle body to hold one end of the electric wire W, and other end-side holding portion 3 provided between the door panel P and the door trim T to hold the other end of the electric wire W. FIGS. 1A and 1B are perspective views of the sliding door D of the first embodiment as viewed from inside of a vehicle. FIGS. 1A and 1B illustrate a fully closed state of the sliding door D, a right side of each of FIGS. 1A and 1B shows a front side of the vehicle, and a left side show a rear side of the vehicle. The sliding door D is slid and opened leftward (rearward of vehicle) from this fully closed state. FIG. 1A is a perspective view of the sliding door D, and FIG. 1B is a plan view of a later-described second turning arm 33 illustrated in FIG. 1A as viewed from above. FIG. 2 is a diagram illustrating a state where the sliding door D illustrated in FIGS. 1A and 1B is moving rearward while projecting outward of the vehicle at an initial opening stage of the sliding door D.

The one end-side holding portion 2 is provided in the vicinity of a floor in the vehicle body, and swingably holds one end of the electric wire W. In the one end-side holding portion 2, the electric wire W is inserted toward an electronic device such as a control device. The one end-side holding portion 2 includes, for example, an outer member fixed to the vehicle body and an inner member rotatably supported by the outer member. The electric wire W is held by the inner member, the electric wire W is inserted into the outer member and is connected to the control device.

The other end-side holding portion 3 is composed of abase 31 fixed to the door inner panel P2, a first turning arm 32 turnably supported by the base 31, a second turning arm 33 turnably supported by a tip end of the first turning arm 32, a tip end-holding portion 34 provided on a tip end of the second turning arm 33 to hold the electric wire W, and a torsion coil spring (not shown) as biasing unit which is incorporated in a shaft portion of the first turning arm 32 and which biases the first turning arm 32 against the base 31. This torsion coil spring biases the first turning arm 32 in a counterclockwise direction in FIGS. 1A, 1B, and 2. That is, the first turning arm 32 is biased by the torsion coil spring in the counterclockwise direction in the fully closed state of the sliding door D illustrated in FIGS. 1A and 1B, tension is applied to the electric wire W, and as the sliding door D is opened, the electric wire W tries to be suspended downward, the first turning arm 32 turns in the counterclockwise direction by the torsion coil spring with respect to the electric wire W whose tension is reduced, and the electric wire W is pulled upward by this turning motion. The other end-side holding portion 3 absorbs an extra length of the electric wire W by the first turning arm 32 which is biased by the torsion coil spring, and functions to prevent the electric wire W from being suspended downward.

Figure 2:
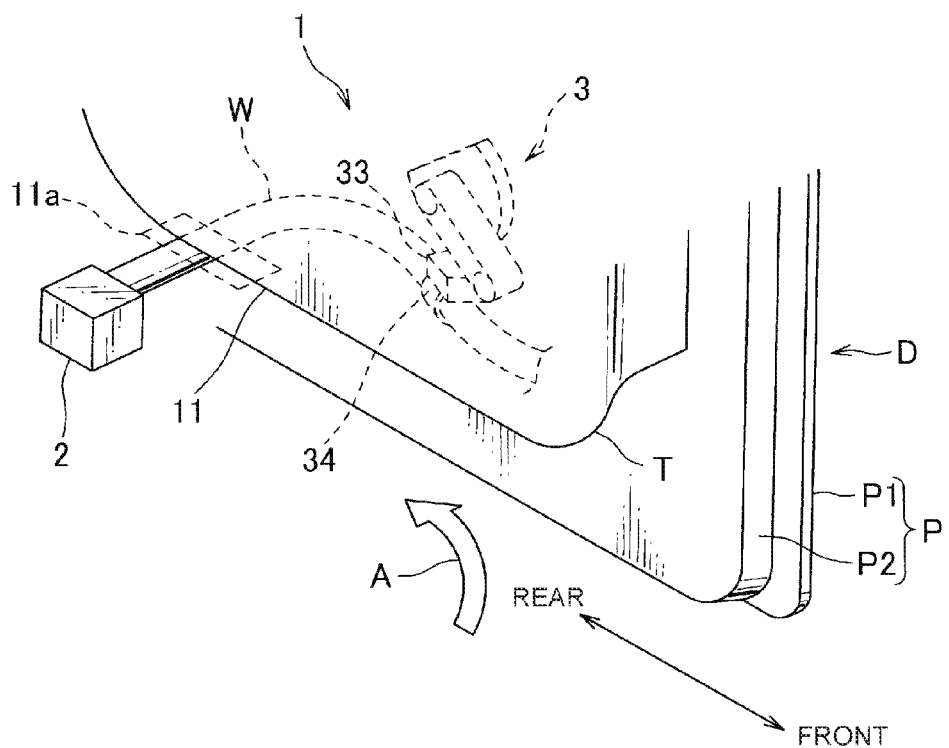
FIG. 2 is a diagram illustrating a state where the sliding door illustrated in FIGS. 1A and 1B is moving rearward while projecting outward of the vehicle at an initial opening stage of the sliding door.

Here, when the sliding door D opens, the sliding door D moves rearward while projecting outward of the vehicle as shown by an arrow A in FIG. 2. At this time, a portion of the electric wire W located in a space between the door panel P and the door trim T of the sliding door D is pulled diagonally upward on a front side of the vehicle by the other end-side holding portion 3. By this pulling-up motion and projecting motion of the sliding door D, a portion of the electric wire W in the space close to the one end-side holding portion 2 reaches a predetermined climbing-over position 11a of a lower end edge 11 of the door trim T, and this portion of the electric wire W climbs over the climbing-over position 11a toward the vehicle body as shown in FIG. 2.

In the power supply structure 1 for the sliding door of the embodiment, a tip end of the second turning arm 33 has a bent-shape which faces toward the space located on the side of the door trim T in the sliding door D, i.e., toward the door panel P. According to this, as illustrated in FIGS. 1A, 1B, and 2, the electric wire W extends from the tip end-holding portion 34 toward the door panel P and then, the electric wire W is pulled and folded by the one end-side holding portion 2, and the electric wire W goes through the lower end edge 11 in a state where the electric wire W inclines with respect to the lower end edge 11 of the door trim T. As a result, at the climbing-over timing, the electric wire W climbs over the climbing-over position 11a while keeping the inclined attitude in this manner. As a result, the electric wire W is restrained from being caught in the lower end edge 11 of the door trim T when the electric wire W climbs over, the electric wire W can smoothly climb over the lower end edge 11 of the door trim T, and vibration of the electric wire W when it climbs over can be suppressed. According to this, when the sliding door D opens, an unusual noise caused by the vibration of the electric wire W is suppressed.

Figure 1B:
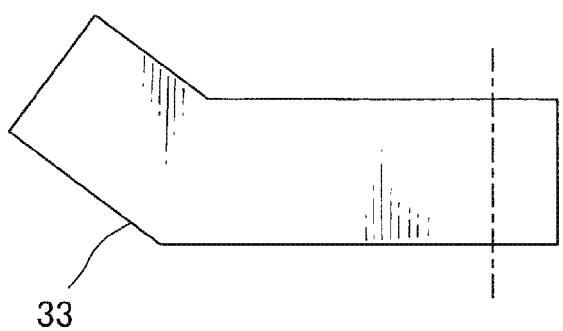

When the sliding door D is to be closed, the sliding door D moves forward of the vehicle and projects inward of the vehicle immediately before the sliding door D reaches its fully closed state illustrated in FIGS. 1A and 1B. At this time, the electric wire W climbs over the lower end edge 11 of the door trim T toward the door panel P. At this time also, the electric wire W is restrained from being caught in the lower end edge 11 of the door trim T by the second turning arm 33 having the bent-shape, and the unusual noise caused by vibration of the electric wire W when the sliding door D is closed is also suppressed.

Figure 3:
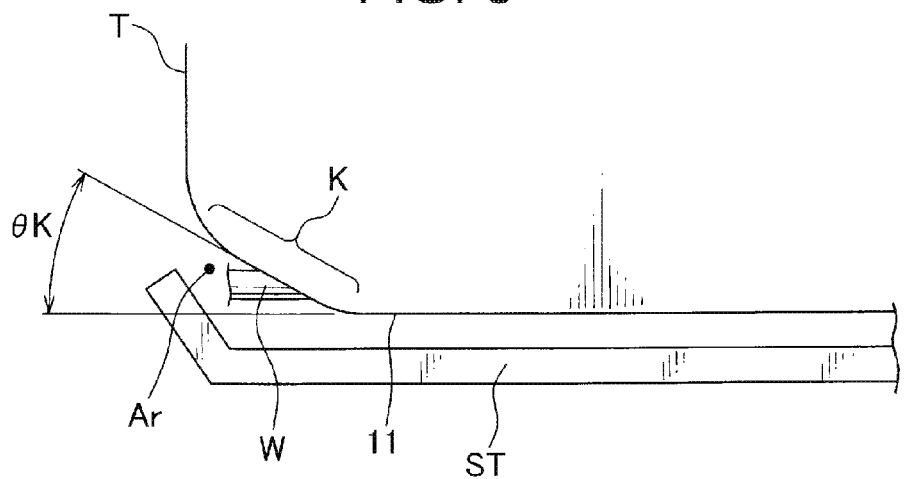
FIG. 3 is a diagram illustrating a kick-up portion provided on a lower end edge of a door trim.

Here, a later-described kick-up portion is provided on the lower end edge 11 of the door trim T on the rear side of the vehicle. FIG. 3 illustrates the kick-up portion provided on the lower end edge 11 of the door trim T. As illustrated in FIG. 3, the scuff trim ST is placed on the floor of the vehicle. The kick-up portion K is formed by raising the lower end edge 11 of the door trim T upward at a kick-up angle θK to separate from the scuff trim ST on the rear side of the vehicle.

Figure 14:
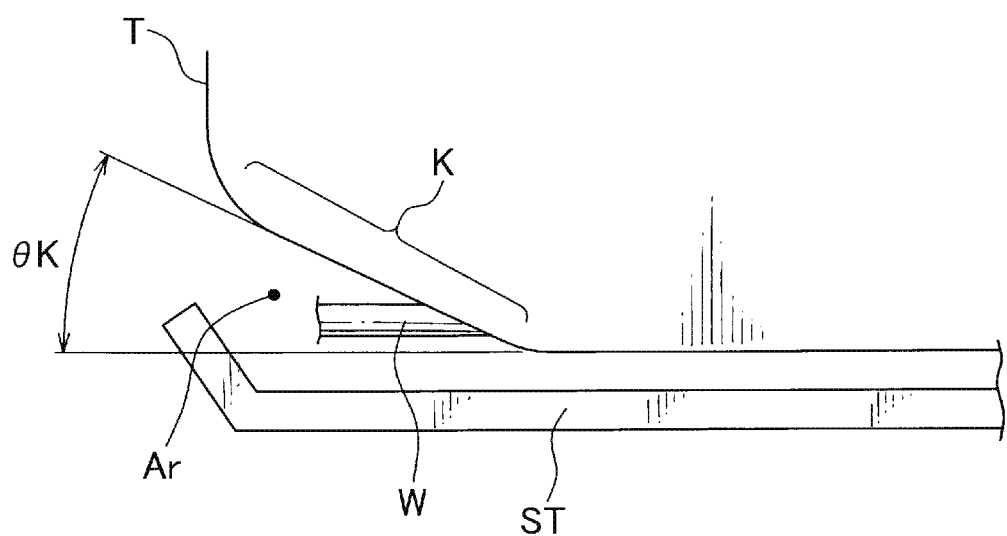
FIG. 14 is a diagram showing a kick-up portion provided on a lower end edge of the door trim.

This kick-up portion K helps the electric wire W to climb over the lower end edge 11 of the door trim T but according to this embodiment, since the electric wire W is restrained from being caught as described above, the kick-up portion K of the embodiment can be reduced in size as compared with the kick-up portion K in the conventional sliding door D illustrated in FIG. 14 for example. As a result, the gap Ar between the scuff trim ST and the door trim T on the floor of the vehicle is reduced in size, and the appearance of the sliding door D is enhanced.

Here, as a structure for inclining the electric wire W as described above, the following structure can be employed as other examples in addition to the bent-shape of the second turning arm 33 illustrated in FIGS. 1A, 1B, and 2.

Figure 4A:
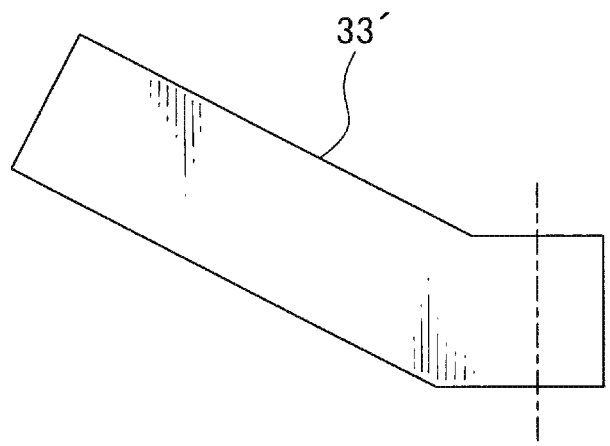
FIGS. 4A and 4B are diagrams illustrating other examples of a structure for inclining an electric wire.
Figure 4B:
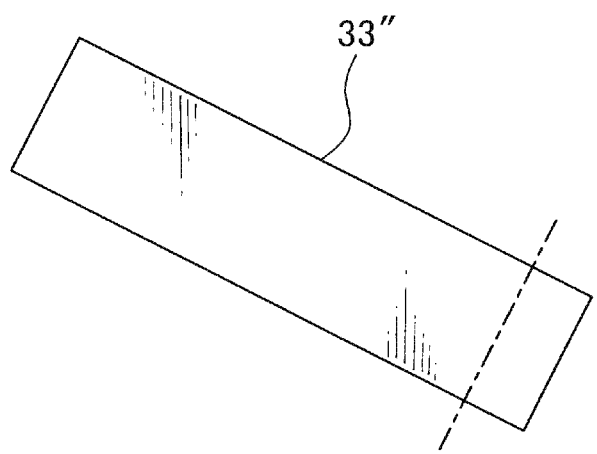

FIGS. 4A and 4B are diagrams illustrating the other examples of the structure for inclining the electric wire W. FIG. 4A illustrates a second turning arm 33' having a bent-shape facing toward the door panel P at a root in the vicinity of the turning shaft. FIG. 4B illustrates a second turning arm 33" in which the turning shaft itself inclines toward the door panel P. According to any of the second turning arms 33' and 33" also, the electric wire W can smoothly climb over the climbing-over position 11a by inclining the electric wire W as described above.

The structure for inclining the electric wire W as described above is not limited to the structure in which the second turning arm is formed into the bent-shape or the structure in which the turning shaft is inclined, and it is also possible to employ a structure in which the first turning arm 32 supporting the second turning arm is formed into a bent-shape and a structure in which the turning shaft is inclined. Even if the first turning arm 32 has such structures, it is of course possible to incline the electric wire W and to make the electric wire W smoothly climb over the climbing-over position 11a.

In the above-described first embodiment and its other examples, the electric wire W is inclined toward the door panel P as one example. However, a direction of inclination of the electric wire W is not limited to this, and the electric wire W may be inclined toward the door trim T.

Figure 5A:
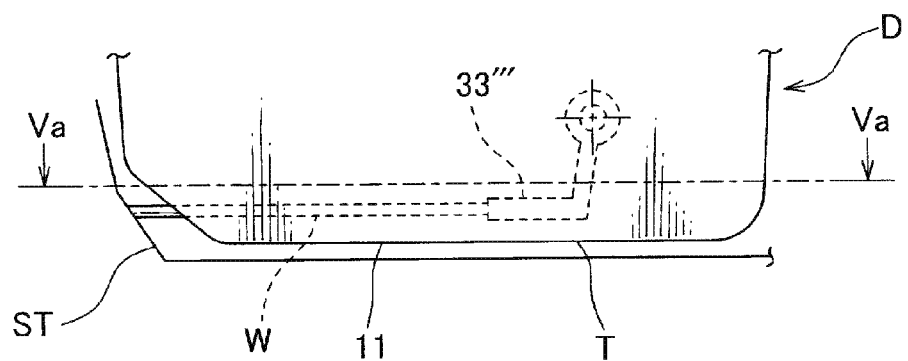
FIGS. 5A and 5B are diagrams illustrating a structure of another example in which the electric wire is inclined toward the door trim.
Figure 5B:
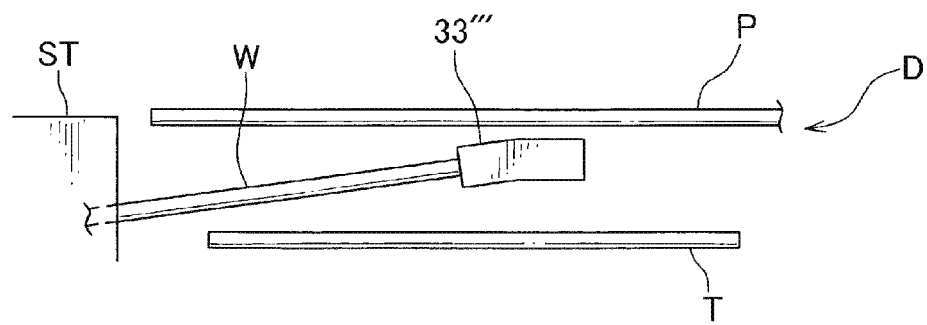

FIGS. 5A and 5B are diagrams illustrating a structure of another example in which the electric wire W is inclined toward the door trim T. FIG. 5A is a side view of the sliding door D as viewed from inside of the vehicle, and FIG. 5B is a sectional view taken along arrows Va in FIG. 5A.

In the structures of the other example illustrated in FIGS. 5A and 5B, a second turning arm 33''' has such a bent-shape that a tip end thereof faces toward the door trim T. According to this bent-shape also, the electric wire W climbs over the lower end edge 11 of the door trim T in the inclined state. Therefore, according to the structure of this other example also, the electric wire W can smoothly climb over.

Next, a power supply structure for a sliding door according to a second embodiment of the present invention will be described using FIGS. 6, 7, 8A, and 8B. This second embodiment is similar to the first embodiment except the first turning arm and the second turning arm. In the second embodiment, description of points which are similar to the first embodiment will be omitted, and points which are different from the first embodiment will be described.

Figure 6:
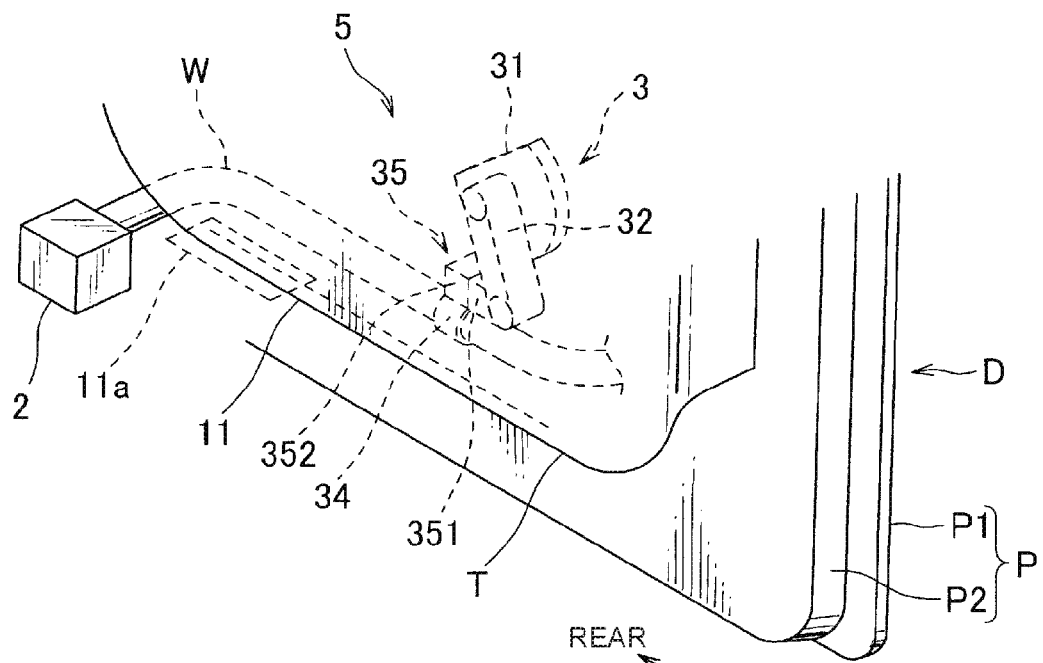
FIG. 6 is a perspective view of a sliding door according to a power supply structure for the sliding door of a second embodiment as viewed from inside of a vehicle.
Figure 7:
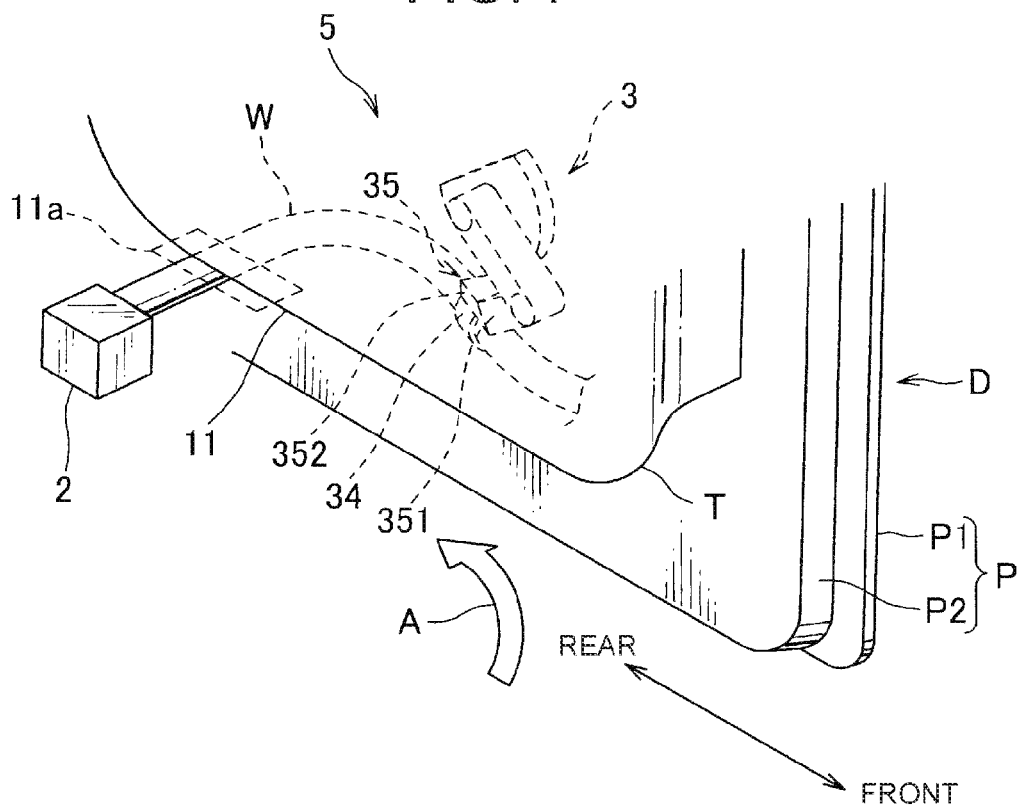
FIG. 7 is a diagram illustrating a state where the sliding door illustrated in FIG. 6 is moving rearward while projecting outward of the vehicle at an initial opening stage of the sliding door.

FIG. 6 is a perspective view of the sliding door D according to the power supply structure 5 for the sliding door of the second embodiment as viewed from inside of a vehicle. FIG. 6 shows a fully closed state of the sliding door D, a right side in FIG. 6 shows a front side of the vehicle and a left side shows a rear side of the vehicle. The sliding door D slidably opens leftward (rearward of vehicle) in FIG. 6 from the fully closed state. FIG. 7 is a diagram illustrating a state where the sliding door D illustrated in FIG. 6 is moving rearward while projecting outward of the vehicle at an initial opening stage of the sliding door D.

According to the power supply structure 5 for the sliding door of this embodiment, a second turning arm 35 supported by a first turning arm 32 includes a root arm portion 351 and a tip end arm portion 352. The tip end arm portion 352 is provided with a tip end-holding portion 34, and the tip end arm portion 352 is turnably connected to the root arm portion 351 through a connection shaft 353 (illustrated in FIGS. 8A and 8B. A torsion coil spring (not shown) as biasing unit is incorporated in this connection shaft 353. This torsion coil spring biases the tip end arm portion 352 in such a direction that an extending direction of the tip end arm portion 352 and an extending direction of the root arm portion 351 are aligned and the second turning arm 35 becomes linear.

When the electric wire W climbs over, at climbing-over timing at which the electric wire W reaches a climbing-over position 11a, later-described angle-changing unit changes an angle of the tip end arm portion 352 with respect to the root arm portion 351, thereby bending the second turning arm 35. According to this, at the climbing-over timing, a tip end of the second turning arm 35, i.e., the tip end arm portion 352 is directed toward a space located on the side of a door trim T in the sliding door D, i.e., toward a door panel P.

Figure 8A:
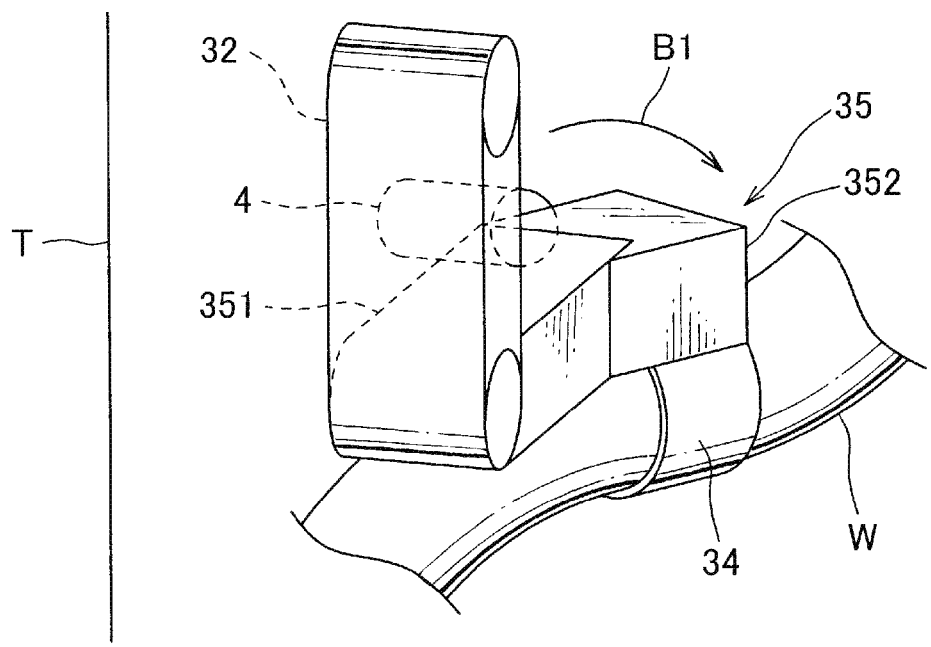
FIGS. 8A and 8B are diagrams illustrating angle-changing unit for changing an angle of a tip end arm portion with respect to a root arm portion.
Figure 8B:
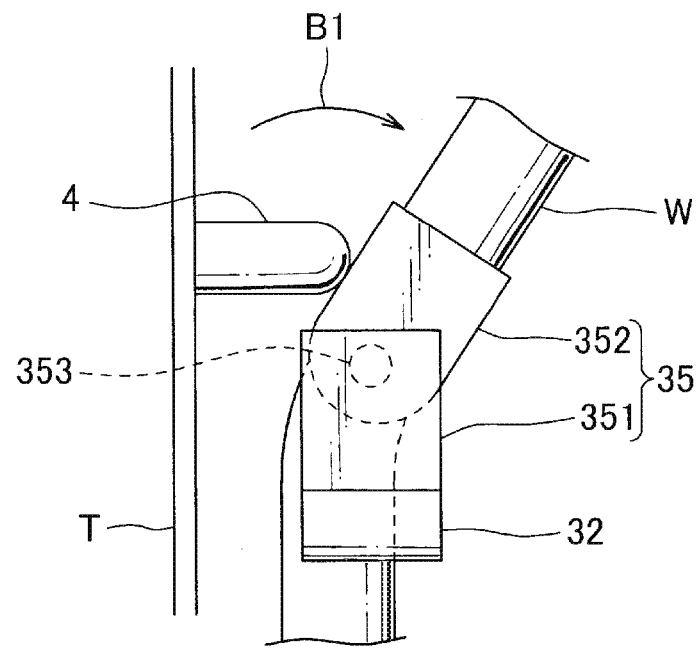

FIGS. 8A and 8B are diagrams illustrating the angle-changing unit for changing an angle of the tip end arm portion 352 with respect to the root arm portion 351. FIG. 8A is a perspective view of a configuration of the angle-changing unit as viewed from the door panel P toward the door trim T. FIG. 8B is a plan view of the configuration illustrated in FIG. 8A as viewed from above.

In this embodiment, the angle-changing unit is composed of a second turning arm 35 to which the root arm portion 351 and the tip end arm portion 352 are connected, and a projection 4 which projects from the door trim T toward the door panel P and which presses the tip end arm portion 352. When the sliding door D is opened, the electric wire W reaches the climbing-over position 11a illustrated in FIGS. 1A, 1B, and 2 by turning motion of the first turning arm 32 and the second turning arm 35 caused when the electric wire W is pulled up, and by projecting motion of the sliding door D to outside of the vehicle. A tip end of the projection 4 comes into contact with the tip end arm portion 352 of the second turning arm 35 at the climbing-over timing, and the tip end arm portion 352 is pressed toward the door panel P. According to this, the tip end arm portion 352 turns in a direction of an arrow B1.

By this turning motion of the tip end arm portion 352 at the climbing-over timing, the electric wire W moves from the tip end-holding portion 34 toward the door panel P as illustrated in FIG. 7 and then, the electric wire W is pulled by a one end-side holding portion 2 and is folded, and the electric wire W climbs over the lower end edge 11 in a state where the electric wire W inclines with respect to the lower end edge 11 of the door trim T. As a result, the electric wire W is restrained from being caught in the lower end edge 11 of the door trim T when the electric wire W climbs over, the electric wire W can smoothly climb over the lower end edge 11 of the door trim T, and vibration of the electric wire W when it climbs over can also be suppressed. According to this, an unusual noise caused by vibration of the electric wire W when the sliding door D opens is suppressed.

When the sliding door D is closed, the sliding door D projects inward of the vehicle while moving forward of the vehicle immediately before the sliding door D reaches the fully closed state illustrated in FIG. 6. At this time, the electric wire W climbs over the lower end edge 11 of the door trim T toward the door panel P. At this time also, the electric wire W is restrained from being caught in the lower end edge 11 of the door trim T by the turning motion of the tip end arm portion 352 carried out by the projection 4, and an unusual noise caused by vibration of the electric wire W when the sliding door D is closed is suppressed.

In this embodiment also, the kick-up portion K (see FIG. 3) can be reduced in size while taking, into consideration, the fact that the electric wire W is restrained from being caught. According to this, a gap Ar between the scuff trim ST and the door trim T on the floor of the vehicle is reduced, and appearance of the sliding door D is enhanced.

In this embodiment, since the tip end of the second turning arm 35 is directed toward the door panel P at the climbing-over timing, rubbing between the door trim T, the door panel P and the electric wire W except at the climbing-over timing can be suppressed, and the electric wire W can smoothly climb over the lower end edge 11 of the door trim T.

It is not always necessary that the electric wire W is inclined toward the door panel P in this embodiment also, and the electric wire W may be inclined toward the door trim T of course as in the structure of the other examples of the first embodiment illustrated in FIGS. 5A and 5B. In this case, when a projection is employed as the angle-changing unit, the projection projects from the door panel P toward the door trim T.

In this embodiment, since the angle-changing portion served by the projection 4 is the tip end arm portion 352 which is a portion of the second turning arm 35, an angle-changing structure in which the angle-changing portion is suppressed to the minimum level is realized.

Next, another example of the angle-changing unit will be described using FIGS. 9A and 9B.

Figure 9A:
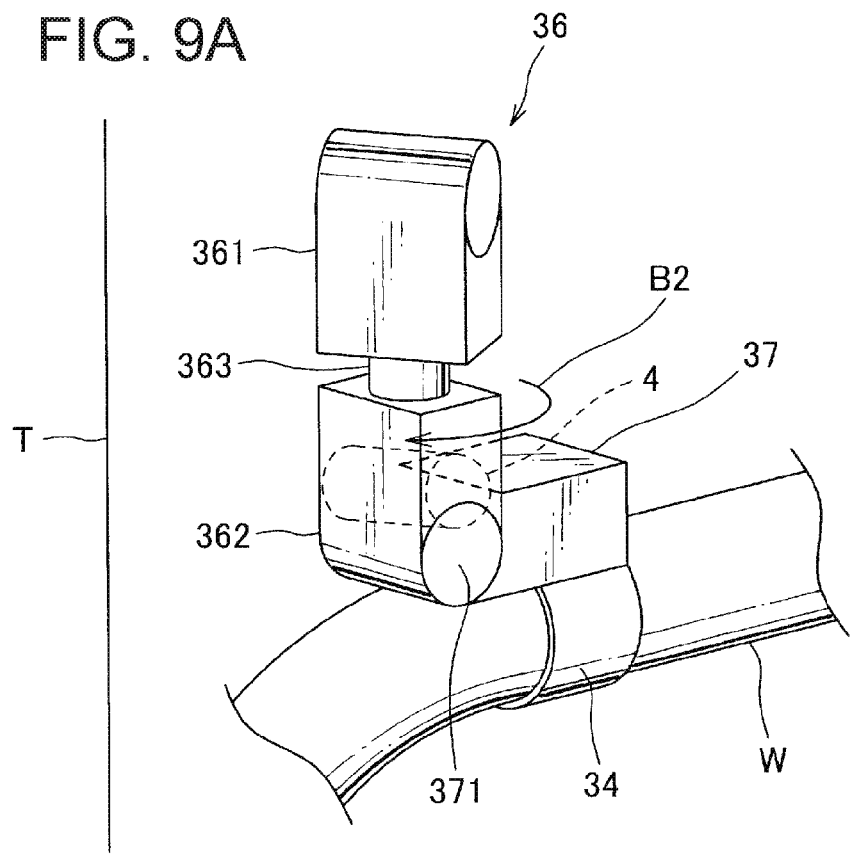
FIGS. 9A and 9B are diagrams illustrating another example of the angle-changing unit.
Figure 9B:
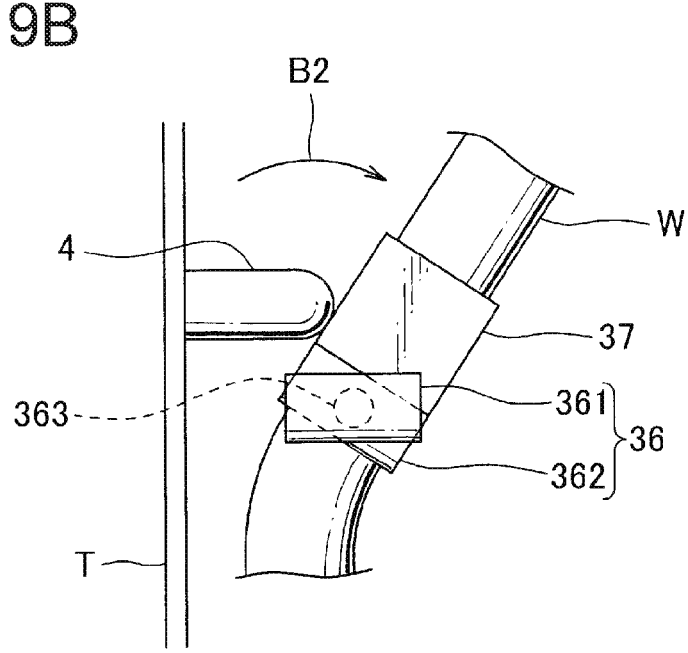

FIGS. 9A and 9B illustrate the other example of the angle-changing unit. FIG. 9A is a perspective view of the angle-changing unit of the other example as viewed from a door panel P toward a door trim T. FIG. 9B is a plan view of the configuration illustrated in FIG. 9A as viewed from above.

According to the angle-changing unit of this other example, a first turning arm 36 includes a root arm portion 361 and a tip end arm portion 362. The root arm portion 361 is turnably supported by a base 31 illustrated in FIG. 6, the tip end arm portion 362 is turnably connected to the root arm portion 361, and a second turning arm 37 is turnably supported by a tip end of the tip end arm portion 362. The electric wire W is held by a tip end-holding portion 34 provided on a tip end of the second turning arm 37.

In the first turning arm 36, a connection shaft 363 which connects the root arm portion 361 and the tip end arm portion 362 to each other intersects with a turning shaft 371 of the second turning arm 37 at right angles. A torsion coil spring (not shown) as biasing unit is incorporated in the connection shaft 363. This torsion coil spring biases the tip end arm portion 362 in a direction in which the first turning arm 36 becomes linear such that an outer surface of the root arm portion 361 and an outer surface of the tip end arm portion 362 are aligned with each other.

The angle-changing unit of this other example is composed of the first turning arm 36 in which the root arm portion 361 and the tip end arm portion 362 are connected to each other, and a projection 4 which projects from the door trim T toward the door panel P and which presses the second turning arm 37 as will be described later.

When the sliding door D is opened, by turning motion of the first turning arm 36 and the second turning arm 37 when the electric wire W is pulled up and by projecting motion of the sliding door D outward of the vehicle, a tip end of the projection 4 comes into contact with the second turning arm 37 at the climbing-over timing at which the electric wire W reaches the climbing-over position 11a illustrated in FIGS. 6 and 7, and the second turning arm 37 is pressed toward the door panel P. According to this, the tip end arm portion 362 of the first turning arm 36 and the second turning arm 37 turn in a direction of an arrow B2 together with the turning shaft 371.

By the turning motion of the tip end arm portion 362 of the first turning arm 36 at the climbing-over timing, the electric wire W climbs over the lower end edge 11 in a state where the electric wire W inclines with respect to the lower end edge 11 of the door trim T like the electric wire W in the second embodiment illustrated in FIG. 7. As a result, the electric wire W is restrained from being caught in the lower end edge 11 of the door trim T when the electric wire W climbs over, the electric wire W can smoothly climb over the lower end edge 11 of the door trim T, and vibration of the electric wire W when it climbs over can be suppressed. According to this, an unusual noise caused by vibration of the electric wire W is suppressed when the sliding door D is opened.

When the sliding door D is closed, the electric wire W is restrained from being caught in the lower end edge 11 of the door trim T by the turning motion of the tip end arm portion 362 carried out by the projection 4, and an unusual noise caused by vibration of the electric wire W when the sliding door D is closed is suppressed.

In this other example also, the kick-up portion K (see FIG. 3) can be reduced in size while taking, into consideration, the fact that the electric wire W is restrained from being caught, a gap Ar between the scuff trim ST and the door trim T can reduced, and appearance of the sliding door D can be enhanced.

In the angle-changing unit of this other example also, like the second embodiment, since the tip end of the second turning arm 37 is directed toward the door panel P at the climbing-over timing, rubbing between the door trim T, the door panel P and the electric wire W except at the climbing-over timing can be suppressed, and the electric wire W can smoothly climb over the lower end edge 11 of the door trim T.

In the angle-changing unit of this other example, the angle-changing portion served by the projection 4 is the turning shaft 371 of the second turning arm 37 with respect to the first turning arm 36, and an angle-changing structure in which strength deterioration of the second turning arm 37 itself is suppressed is realized.

Next, a further another example of the angle-changing unit will be described using FIGS. 10A and 10B.

Figure 10A:
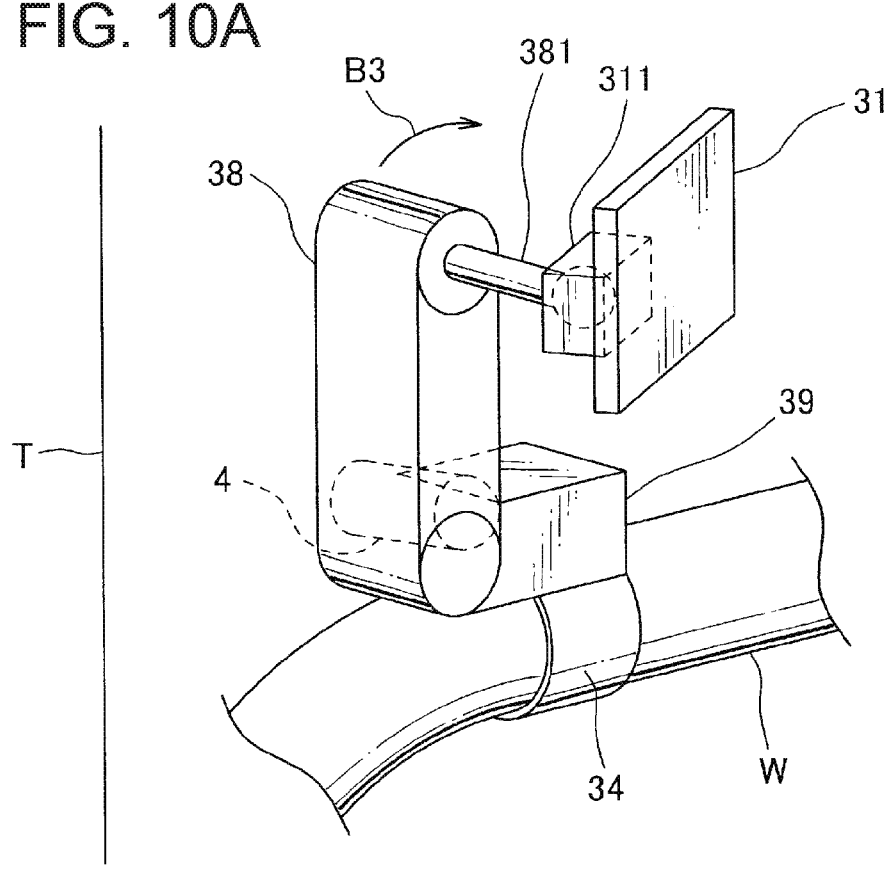
FIGS. 10A and 10B are diagrams illustrating further another example of the angle-changing unit.
Figure 10B:
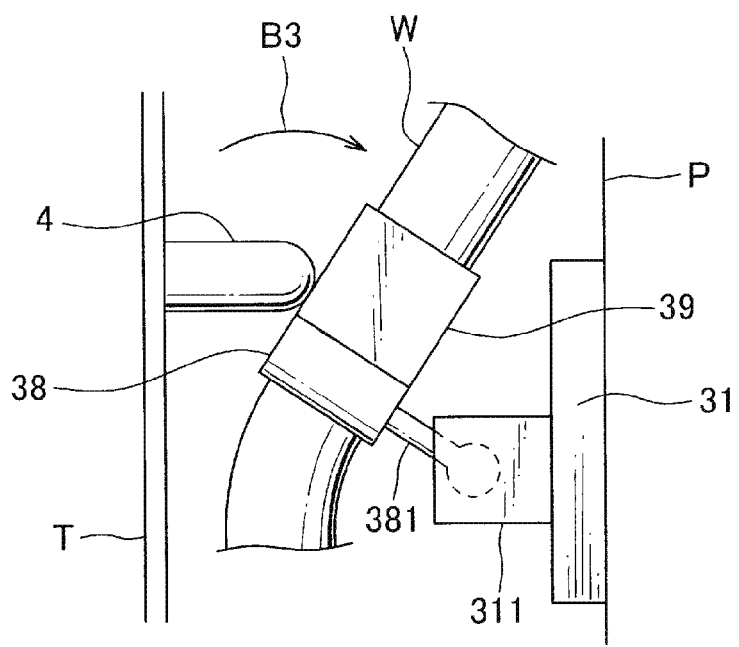
Figure 11:
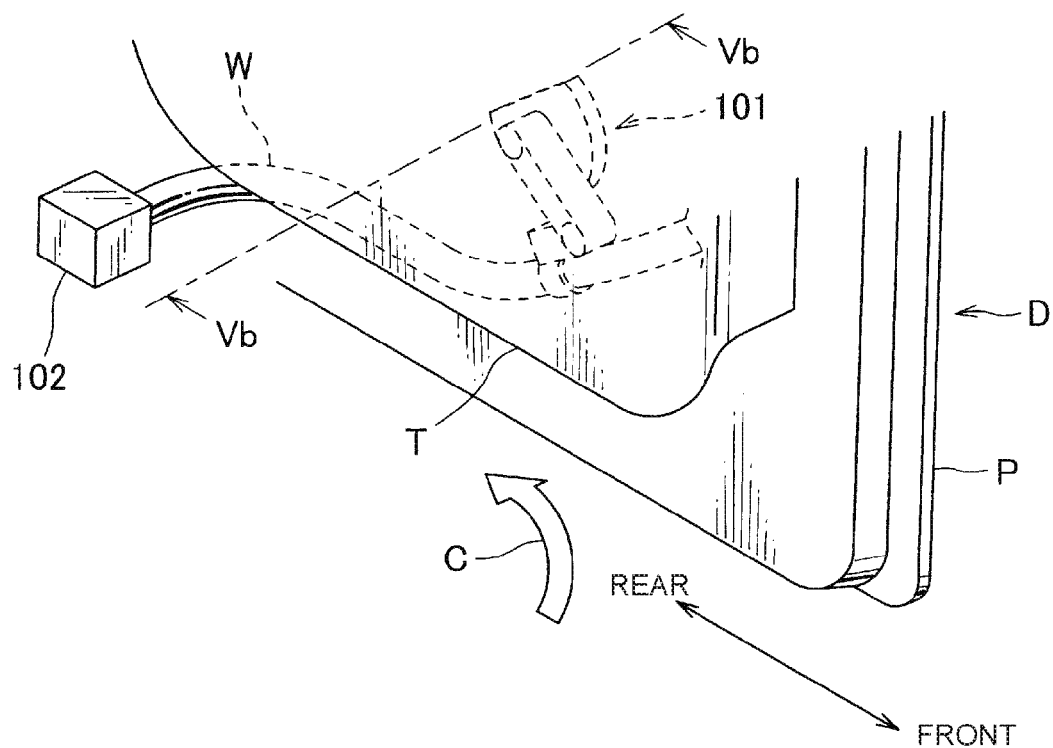
FIG. 11 is a perspective view of a conventional sliding door as viewed from inside of a vehicle.
Figure 12:
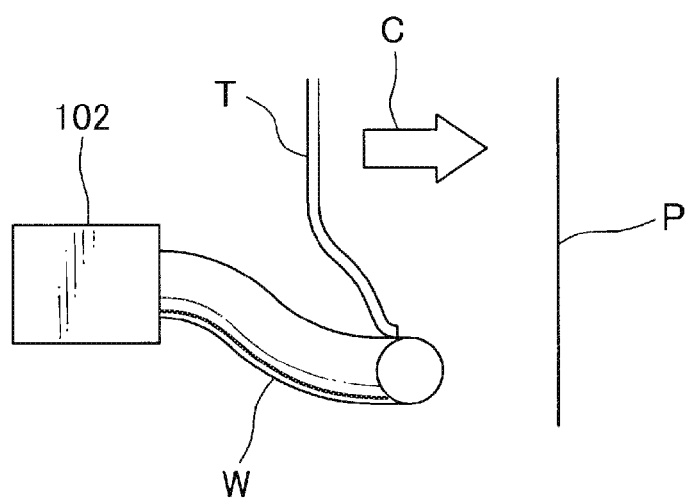
FIG. 12 is a sectional view taken along arrows Vb line in FIG. 11.
Figure 13A:
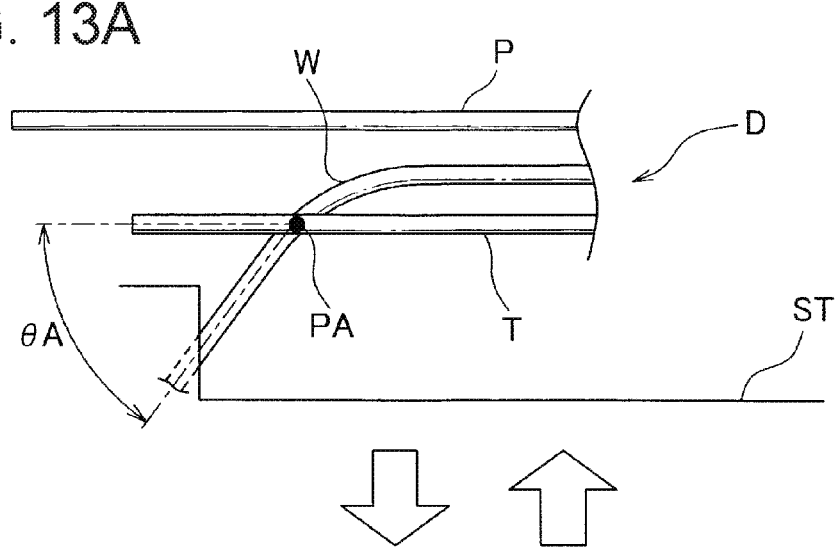
FIGS. 13A to 13C are schematic diagrams illustrating a positional relation between the sliding door and an electric wire when the sliding door opens and closes.
Figure 13B:
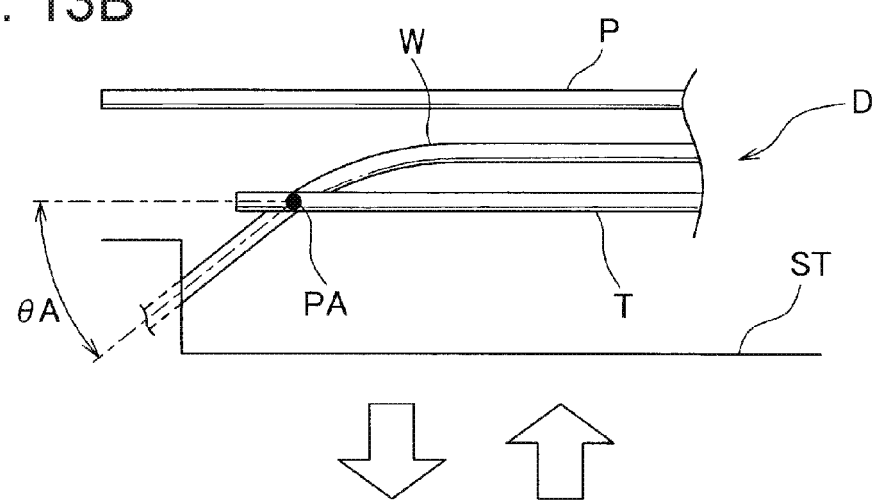
Figure 13C:
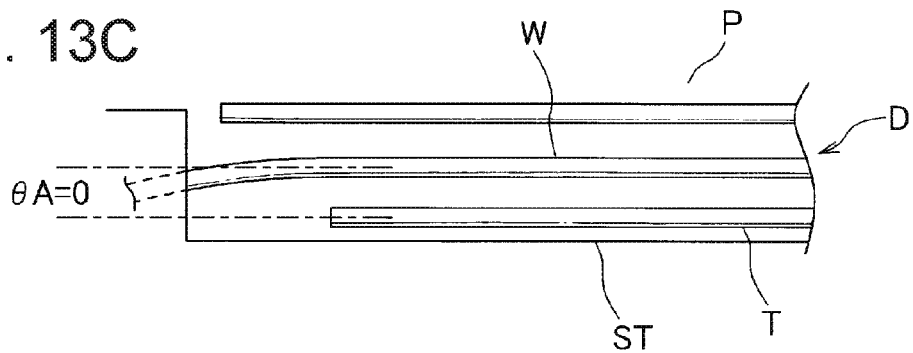

FIGS. 10A and 10B show the other example of the angle-changing unit.

In the angle-changing unit of the other example, a turning shaft 381 which turnably supports a first turning arm 38 is supported by a bearing 311 provided on a base 31 such that the turning shaft 381 can incline with respect to the base 31. A second turning arm 39 is turnably supported by a tip end of the first turning arm 38. An electric wire W is held by a tip end-holding portion 34 provided on a tip end of the second turning arm 39.

The turning shaft 381 of the first turning arm 38 is biased by a spring (not shown) incorporated in the bearing 311 in a direction intersecting with the base 31 at right angles.

The angle-changing unit of the other example is composed of the turning shaft 381 of the first turning arm 38, and a projection 4 which projects from a door trim T toward the door panel P and which presses the second turning arm 39 as will be described later.

According to the angle-changing unit of this other example, when the sliding door D is opened, by turning motion of the first turning arm 38 and the second turning arm 39 when the electric wire W is pulled up and by projecting motion of the sliding door D outward of the vehicle, a tip end of the projection 4 presses the second turning arm 39 toward the door panel P at the climbing-over timing at which the electric wire W reaches the climbing-over position 11a illustrated in FIGS. 6 and 7. According to this, the turning shaft 381 of the first turning arm 38 inclines with respect to the base 31 in a direction of an arrow B3 and as a result, a tip end of the second turning arm 39 is directed toward the door panel P.

By the inclination of the turning shaft 381 of the first turning arm 38 at the climbing-over timing, the electric wire W climbs over the lower end edge 11 in a state where the electric wire W inclines with respect to the lower end edge 11 of the door trim T like the electric wire W of the second embodiment illustrated in FIG. 7. As a result, the electric wire W is restrained from being caught in the lower end edge 11 of the door trim T when the electric wire W climbs over, the electric wire W can smoothly climb over the lower end edge 11 of the door trim T, and vibration of the electric wire W when the electric wire W climbs over is suppressed. According to this, an unusual noise caused by vibration of the electric wire W is suppressed when the sliding door D is opened.

When the sliding door D is closed, the electric wire W is restrained from being caught in the lower end edge 11 of the door trim T by the inclination of the turning shaft 381 of the first turning arm 38 by the projection 4, and an unusual noise caused by vibration of the electric wire W is suppressed when the sliding door D is closed.

In this other example also, the kick-up portion K (see FIG. 3) can be reduced in size while taking, into consideration, the fact that the electric wire W is restrained from being caught, a gap Ar between the scuff trim ST and the door trim T can reduced, and appearance of the sliding door D can be enhanced.

In the angle-changing unit of this other example also, like the second embodiment, since the tip end of the second turning arm 39 is directed toward the door panel P at the climbing-over timing, rubbing between the door trim T, the door panel P and the electric wire W except at the climbing-over timing can be suppressed, and the electric wire W can smoothly climb over the lower end edge 11 of the door trim T.

In this embodiment, the angle-changing portion served by the projection 4 is the turning shaft 381 of the first turning arm 38 with respect to the base 31. Therefore, an angle-changing structure is realized without changing a simple turning structure of an arm structure itself composed of the first turning arm 38 and the second turning arm 39.

The above-described second embodiment and the two other examples of the angle-changing unit, the projection 4 which projects from the door trim T presses the second turning arm, thereby inclining the tip end of the second turning arm in the longitudinal direction of the vehicle as one example of the angle-changing unit mentioned in the present invention. However, the angle-changing unit mentioned in the present invention is not limited to this configuration. The angle-changing unit mentioned in the present invention may employ such a configuration that a cam mechanism which inclines the first turning arm or the second turning arm at a turning angle corresponding to the climbing-over timing at which the electric wire W reaches the climbing-over position 11a is mounted on the turning shaft of the first turning arm or the turning shaft of the second turning arm.

The above-described embodiments only show typical modes of the present invention, and the invention is not limited to the embodiments. That is, the present invention may be carried out while variously modifying the invention within a scope not departing from the subject matters of the invention.

For example, as the configuration for inclining the tip end of the turning arm with respect to the longitudinal direction of the vehicle, the power supply structures 1 and 5 for the sliding door of the embodiments show the configuration (first embodiment) in which the turning arm has the bent-shape so that its tip end is always inclined while including the climbing-over timing, and the configuration (second embodiment) in which the angle-changing unit inclines the tip end of the turning arm at the climbing-over timing. However, the configuration for inclining the tip end of the turning arm with respect to the longitudinal direction of the vehicle is not limited to these configurations, and the tip end of the turning arm may be inclined during an arbitrary period only if the period at least includes the climbing-over timing.

As the configuration for inclining the tip end of the turning arm with respect to the longitudinal direction of the vehicle, the power supply structures 1 and 5 for the sliding door show the configuration (first embodiment) in which one location of the turning arm is formed into the bent-shape, and the configuration (second embodiment) in which one location of the turning arm is bent by the angle-changing unit. However, the configuration for inclining the tip end of the turning arm with respect to the longitudinal direction of the vehicle is not limited to these configurations, and the number of and places of the bent locations of the turning arm are not limited only if at least the tip end of the turning arm is inclined with respect to the longitudinal direction of the vehicle.

Although the base 31 of the other end-side holding portion 3 is fixed to the door inner panel P2 of the sliding door D in the power supply structures 1 and 5 for the sliding door of the embodiments, the base 31 may be fixed to the door trim T. Although the first turning arm 32 turns downward when the sliding door D fully closes and the maximum biasing force from the biasing unit (torsion coil spring) is applied to the first turning arm 32 in the embodiments, the present invention is not limited to this, and the first turning arm 32 may turn against the biasing force of the biasing unit when the sliding door D fully opens. That is, the state of the other end-side holding portion 3 illustrated in FIGS. 1A, 1B, 4A, and 4B may be a state when the sliding door D fully opens.

REFERENCE SIGNS LIST 1, 5 power supply structure for a sliding door
2 one end-side holding portion
3 other end-side holding portion
4 projection
11 lower end edge
31 base
32, 36, 38 first turning arm
33, 35, 37, 39 second turning arm
34 tip end-holding portion
351, 361 root arm portion
352, 362 tip end arm portion

353, 363 connection shaft
371, 381 turning shaft
D sliding door
P door panel
T door trim
W electric wire

The invention claimed is:

1. A power supply structure for a sliding door for routing an electric wire between a vehicle body and the sliding door to supply power, the power supply structure comprises:
   one end-side holding portion arranged on the vehicle body and holding one end of the electric wire; and
   other end-side holding portion holding the other end of the electric wire,
   wherein the other end-side holding portion includes a turning arm turnably supported directly or indirectly by the sliding door and holding the electric wire at a tip end, and biasing unit for biasing the turning arm in a direction to absorb an extra length of the electric wire, and
   wherein the tip end of the turning arm is inclined with respect to a longitudinal direction of a vehicle at climbing-over timing at which the electric wire climbs over a predetermined climbing-over position of a lower end edge of a door trim which configures the sliding door on an inner side of the vehicle when the sliding door is slid and moved.

2. The power supply structure for a sliding door according to claim 1, wherein the tip end of the turning arm has a bent-shape directing toward a space located closer to outside of the vehicle than the door trim in the sliding door.

3. The power supply structure for a sliding door according to claim 1, wherein a turning shaft of the turning arm is inclined with respect to the sliding door.

4. The power supply structure for a sliding door according to claim 1, further comprising angle-changing unit for directing the tip end of the turning arm to a space located closer to outside of the vehicle than the door trim in the sliding door at the climbing-over timing.

\* \* \* \* \*